United States Patent
Mumma et al.

(10) Patent No.: US 10,160,099 B2
(45) Date of Patent: Dec. 25, 2018

(54) SELECTIVELY LEACHED, POLYCRYSTALLINE STRUCTURES FOR CUTTING ELEMENTS OF DRILL BITS

(71) Applicant: Ulterra Drilling Technologies, L.P., Fort Worth, TX (US)

(72) Inventors: Matthew Douglas Mumma, Weatherford, TX (US); Andrew David Murdock, Fort Worth, TX (US); John Martin Clegg, Fort Worth, TX (US); William Henry DuBose, Irving, TX (US); Neal Alan Bowden, Mansfield, TX (US)

(73) Assignee: Ulterra Drilling Technologies, L.P., Fort Worth, TX (US)

( * ) Notice: Subject to any disclaimer, the term of this patent is extended or adjusted under 35 U.S.C. 154(b) by 739 days.

(21) Appl. No.: 14/019,013

(22) Filed: Sep. 5, 2013

(65) Prior Publication Data
US 2014/0069726 A1    Mar. 13, 2014

Related U.S. Application Data

(60) Provisional application No. 61/698,558, filed on Sep. 7, 2012.

(51) Int. Cl.
*E21B 10/36* (2006.01)
*E21B 10/573* (2006.01)
(Continued)

(52) U.S. Cl.
CPC ....... *B24D 18/0009* (2013.01); *B24D 99/005* (2013.01); *C04B 35/528* (2013.01);
(Continued)

(58) Field of Classification Search
CPC ............ E21B 10/46; E21B 10/36; B24D 3/04
See application file for complete search history.

(56) References Cited

U.S. PATENT DOCUMENTS

| | | | |
|---|---|---|---|
| 5,889,219 | A | 3/1999 | Moriguchi et al. |
| 7,712,553 | B2 | 5/2010 | Shamburger |

(Continued)

FOREIGN PATENT DOCUMENTS

CN    102356211 A    2/2012

OTHER PUBLICATIONS

International Search Report and Written Opinion of the International Searching Authority received in Patent Cooperation Treaty Application No. PCT/US2013/058222, dated Feb. 13, 2014, 17 pages.

(Continued)

*Primary Examiner* — Pegah Parvini
(74) *Attorney, Agent, or Firm* — Hubbard Johnston, PLLC

(57) ABSTRACT

The rate of leaching of a polycrystalline diamond (PCD) cutting layer for cutting elements or other wear parts is varied by introduction into the PCD of an additive prior to leaching. Selective introduction of the additive into one or more regions of a PCD cutting structure allows controlling leaching rates of selective leaching of parts of the PCD structure, which allows for creating of a boundary between the leached and non-leached regions of a PCD structure to be made so that is not parallel to the surface or surfaces exposed to the leaching solution. The additive is comprised of a material that increases the permeability of the PCD or acceptance of the PCD to the leaching solution, such as a hydrophile.

26 Claims, 6 Drawing Sheets

(51) Int. Cl.
  *B24D 18/00* (2006.01)
  *E21B 10/55* (2006.01)
  *B24D 99/00* (2010.01)
  *C04B 35/528* (2006.01)

(52) U.S. Cl.
  CPC .......... *E21B 10/55* (2013.01); *E21B 10/5735* (2013.01); *C04B 2235/386* (2013.01); *C04B 2235/3813* (2013.01); *C04B 2235/3826* (2013.01); *C04B 2235/427* (2013.01)

(56) References Cited

U.S. PATENT DOCUMENTS

| | | | |
|---|---|---|---|
| 7,753,143 | B1 | 7/2010 | Miess et al. |
| 8,662,209 | B2 | 3/2014 | Dourfaye et al. |
| 2011/0031033 | A1* | 2/2011 | Mourik .................. C22C 26/00 175/428 |
| 2011/0120782 | A1 | 5/2011 | Cooley et al. |
| 2011/0139514 | A1 | 6/2011 | Voronin et al. |
| 2012/0097458 | A1 | 4/2012 | Voronin et al. |
| 2012/0138370 | A1 | 6/2012 | Mukhopadhyay et al. |
| 2012/0211284 | A1* | 8/2012 | DiGiovanni .............. B22F 3/10 175/428 |
| 2012/0222363 | A1 | 9/2012 | DiGiovanni et al. |
| 2012/0222364 | A1 | 9/2012 | Lyons et al. |

OTHER PUBLICATIONS

Extended European Search Report received in European Application No. 13835774.4, dated Oct. 24, 2016, 14 pages.
First Chinese Office Action received in Chinese Patent Application No. 201380058345.6, dated Oct. 9, 2016, 9 pages.
Response to First Chinese Office Action filed in Chinese Patent Application No. 201380058345.6, dated Apr. 24, 2017, 14 pages.
Second Chinese Office Action received in Chinese Patent Application No. 201380058345.6, dated Jun. 30, 2017, 6 pages.
Response to Second Chinese Office Action filed in Chinese Patent Application No. 201380058345.6, dated Nov. 15, 2017, 7 pages.

* cited by examiner

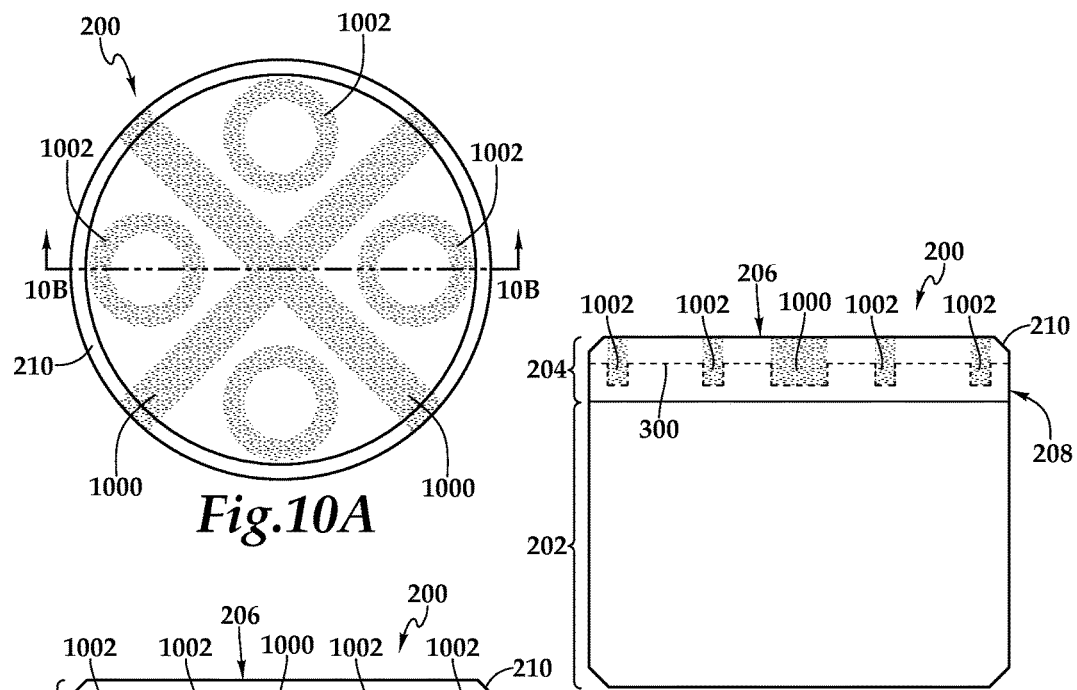
Fig.10A
Fig.10C
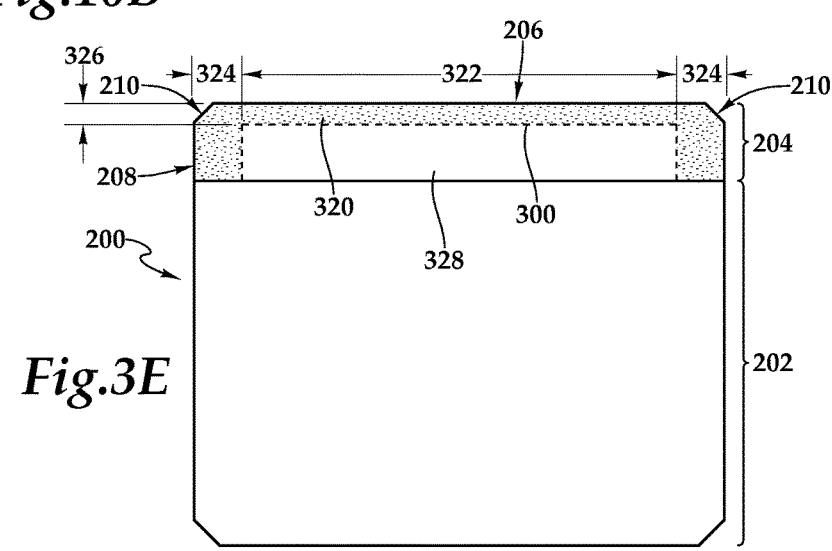
Fig.10B
Fig.3E

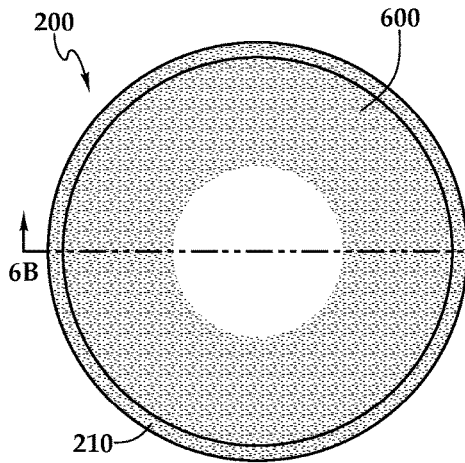
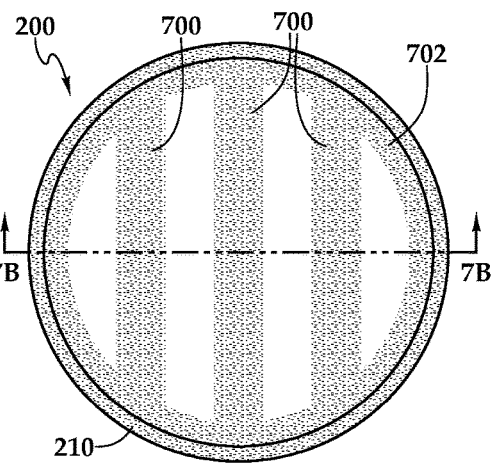
*Fig.6A*   *Fig.7A*
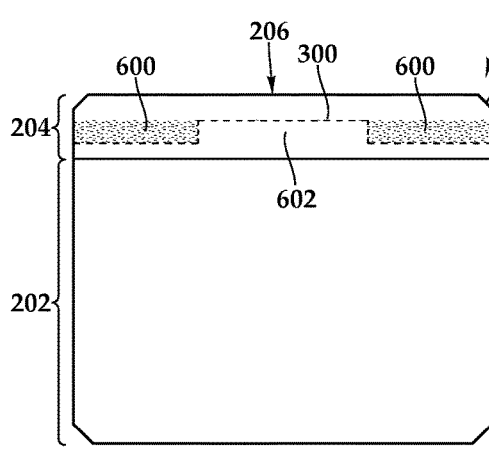
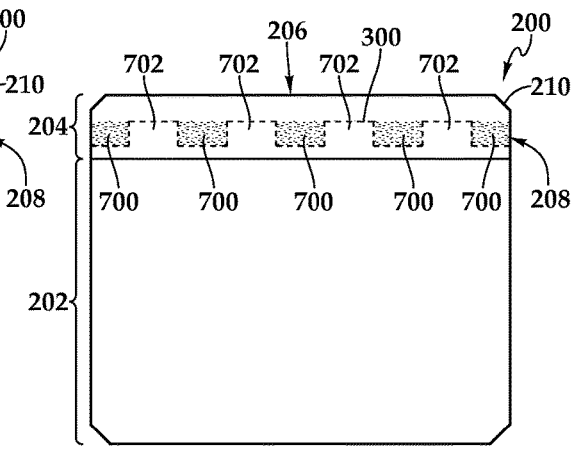
*Fig.6B*   *Fig.7B*
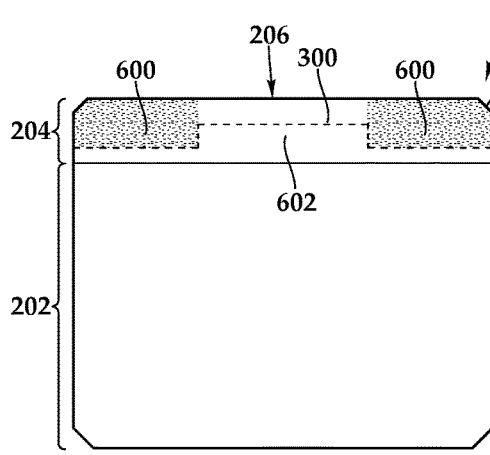
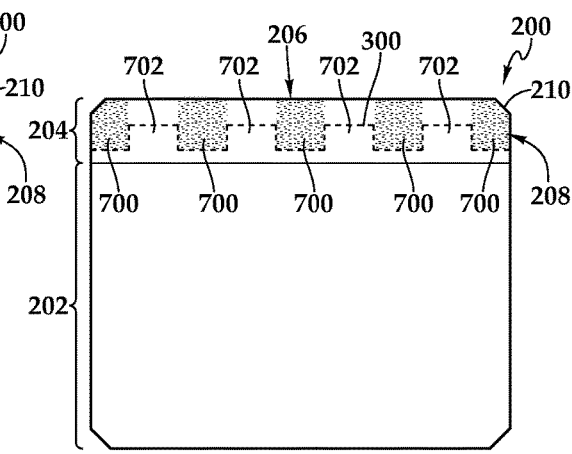
*Fig.6C*   *Fig.7C*

# SELECTIVELY LEACHED, POLYCRYSTALLINE STRUCTURES FOR CUTTING ELEMENTS OF DRILL BITS

CROSS-REFERENCE TO RELATED APPLICATION

This application claims the benefit of U.S. provisional application No. 61/698,558, filed Sep. 7, 2012, entitled "Selectively Leached, Polycrystaline Structures for Cutting Elements of Drill Bits," which is incorporated herein in its entirety by reference for all purposes.

FIELD OF INVENTION

The invention relates generally to partially leached polycrystalline structures, and particularly cutting elements for earth boring drill bits.

BACKGROUND

There are two basic types of drill bits used for boring through subterranean rock formations when drilling oil and natural gas wells: drag bits and roller cone bits.

Drag bits have no moving parts. As a drag bit is rotated, typically by rotating a drill string to which it is attached, discrete cutting elements ("cutters") affixed to the face of the bit drag across the bottom of the well, scraping or shearing the formation. Each cutter of a rotary drag bit is positioned and oriented on the face of the drag bit so that a portion of it, which will be referred to as its wear surface, engages the earth formation as the bit is being rotated. The cutters are spaced apart on an exterior cutting surface or face of the body of a drill bit in a fixed, predetermined pattern. The cutters are typically arrayed along each of several blades, which are raised ridges extending generally radially from the central axis of the bit, toward the periphery of the face, usually in a sweeping manner (as opposed to a straight line). The cutters along each blade present a predetermined cutting profile to the earth formation, shearing the formation as the bit rotates. Drilling fluid pumped down the drill string, into a central passageway formed in the center of the bit, and then out through ports formed in the face of the bit, both cools the cutters and helps to remove and carry cuttings from between the blades.

Roller cone bits are comprised of two or three coneshaped cutters that rotate on an axis at approximately a thirty-five degree angle to the axis of rotation of the drill bit. As the bit is rotated, the cones roll across the bottom of the hole. Cutting elements—often referred to as teeth or inserts—on the surfaces of the cones crush and scrape the rock as they roll over the formation.

In order to improve performance of drill bits, one or more wear or working surfaces of the cutting elements are made from a layer of polycrystalline diamond ("PCD") in the form of a polycrystalline diamond compact ("PDC") that is attached to a substrate. A common substrate is cemented tungsten carbide. Drag bits with such PDC cutting elements are sometimes called "PDC bits." PDC, though very hard with high abrasion or wear resistance, tends to be relatively brittle. The substrate, while not as hard, is tougher than the PDC, and thus has higher impact resistance. The length or height of the substrate is typically long enough to act as a mounting stud, with a portion of it fitting into a pocket or recess formed in the body of the drag bit or, the case of a roller cone bit, in the pocket formed in a cone. However, in some drag bits, the PDC and the substrate structure are attached to a metal mounting stud, which is then inserted into a pocket or other recess.

A polycrystalline diamond compact may be made by mixing polycrystalline diamond grains, in powder form, which is referred to as "diamond grit," with one or more powdered metal catalysts and other materials, forming the mixture into a compact, and then sintering it using high heat and pressure or microwave heating. Although cobalt or an alloy of cobalt is the most common catalyst, other Group VIII metal, such as nickel, iron and alloys thereof can be used as catalyst. For a cutter, a PDC is typically formed by packing diamond grit, without the metal catalyst, adjacent to a substrate of cemented tungsten carbide, and then sintering the two together. During sintering metal binder in the substrate—cobalt in the case of cobalt cemented tungsten carbide—sweeps into and infiltrates the compact, acting as a catalyst to cause formation of diamond-to-diamond bonds between adjacent diamond grains. The result is a mass of bonded diamond crystals, which has been described as a continuous or integral matrix of diamond and even a "lattice," having interstitial voids between the diamond. The interstitial voids are at least partly filled with the metal catalyst.

Substrates for supporting a PDC layer are made, at least in part, from cemented metal carbide, with tungsten carbide being the most common. Cemented metal carbide substrates are formed by sintering powdered metal carbide with a metal alloy binder. The composite of the PDC and the substrate can be fabricated in a number of different ways. It may also, for example, include transitional layers in which the metal carbide and diamond are mixed with other elements for improving bonding and reducing stress between the PDC and substrate. References herein to substrates include such substrates.

Because of the presence of metal catalyst, PDC exhibits thermal instability. Cobalt has a different coefficient of expansion to diamond. It expands at a greater rate, thus tending to weaken the diamond structure at higher temperatures. Furthermore, the melting point of cobalt is lower than diamond, which can lead to the cobalt causing diamond crystals within the PDC to begin to graphitize when temperatures reach or exceed the melting point, also weakening the PDC. To make the PDC more thermally stable, a substantial percentage—usually more than 50%; often 70% to 85%; and possibly more—of the catalyst is removed from at least a region next to one or more working surfaces that experience the highest temperatures due to friction during drilling. The working surfaces are the surfaces of the cutter designed or intended to engage the formation. In the case a PDC cutter, for example, they are typically the typically planar top surface of the diamond crown or table, at least part of its side surface, and, if present, a beveled edge, radiused or shaped transition between the top and side surfaces.

The catalyst is removed by a leaching process. The leaching process involves protecting, or masking, the carbide substrate and placing the PDC in a strong acid, examples of which include nitric acid, hydrofluoric acid, hydrochloric acid, or perchloric acid, and combinations of them. In some cases, the acid mix may be heated and/or agitated to accelerate the leaching process.

Removal of the cobalt is, however, thought to reduce toughness of the PDC, thus decreasing its impact resistance. Furthermore, leaching the PDC can result in removal of some of the cobalt that cements or binds the substrate, thus affecting the strength or integrity of the substrate and/or the interface of the substrate and diamond interface. As a result of these concerns, leaching of cutters is now "partial," meaning that catalyst is removed only from the PDC to a certain depth or distance measured from a working surface or working surfaces of the PDC, such as the top, beveled edge, and/or side of the PDC. Generally, only the top, working surface of the PDC is exposed to the bath. A mask and seal are used to protect the substrate from the acid. The leach depths of conventional, commercially produced cutting elements are substantially consistent across the cutter as measured from the working surface exposed to the acid bath. The depth of the leaching depends on the microstructure of the diamond material, the leaching solution being used, and the leaching time.

SUMMARY

The invention generally pertains to increasing leaching rates in selective regions of PCD, as well as to cutting elements or other wear parts with one or more working surfaces comprised of a layer of sintered PCD, the PCD layer having varying leach depths and geometries relative to its working surface. Increased leach rates enables those regions to be leached more quickly as compared to regions with lower leaching rates, thus enabling leaching to greater depths within the regions, as measured from the surfaces subjected to the leaching solution, before the masks and seals protecting the remainder of the cutting element start to break down. Furthermore, selectively increasing the leaching rates of predetermined regions within a PCD structure allows varying the shape and depth or, more generally, the geometry, of one or more leached regions that extend from the working surface of the structure without the necessity of resorting to complex masks and seals. A boundary between the leached and non-leached regions of a PCD structure can be made so that is not parallel to the surface or surfaces exposed to the leaching solution without the necessity of masking the working surface.

In one embodiment, an additive is introduced into the PCD structure prior to leaching. The additive is comprised of a material that increases the permeability of the PCD or acceptance of the PCD to the leaching solution. One example of such a material is a hydrophile for reducing the surface tension between the leaching solution and the polycrystalline structure which is placed in, or added to, one or more select regions of the structure. The hydrophile may be comprised of, for example, a trace mineral with hydrophilic properties, a lower resistance to wetting, or a lower contact angle of the liquid vapor interface that meets with a solid surface between a leaching solution and gas byproducts and the polycrystalline, composite diamond. These help to convey leaching solutions into the polycrystalline structure, examples of which include positive capillary attraction, wicking, or by reducing capillary resistance. The additive can be introduced into the polycrystalline structure prior to sintering or after sintering.

Examples of hydrophilic additives include titanium diboride ($TiB_2$) wurtzite boron nitride (w-BN), cubic boron nitride (c-BN), zirconium diboride ($ZrB_2$), wurtzite silicon carbide, electrically conductive carbon allotropes, fullerenes, and similar compounds. These example hydrophilic additives include materials having a chemically polar molecular structure, electric dipole or multi-pole moment, a separation of electric charge within the molecule, or electrically conductive substances. Regions with these additives leach more quickly as compared to regions of the sintered polycrystalline diamond structure without the hydrophilic seed material, allowing deeper leaching than otherwise possible due to technical limitations of PCD made without any seeding material.

Faster leaching has a particular advantage with polycrystalline diamond feed stocks that include particles that are less than 30 microns particle in size and PCD that is pressed at higher pressures, since the diamond is denser making the interstitial voids smaller and less connected, inhibiting leaching acid access. Selectively seeding portions or regions of a sintered polycrystalline diamond structure also permits taking advantage of differing leach rates to form leached regions with differing distances or depths and geometries.

Being able to make a PDC cutting element having a non-planar boundary between leached and non-leached areas of a PDC allows for more control over the wear profile of a cutting element. For example, a conventional PDC cutter will, during use, form a wear flat. The presence of the wear flat reduces cutting effectiveness and affects cutting patterns, cutter loading, cutter temperature and drilling efficiency. However, through controlling the geometries of the leached regions of the diamond structure, better wear profiles can be engineered that provide for certain cutting patterns and loading. For example, a PDC cutting element could be designed so that its cutting aggressiveness changes as it wears due to stresses at the cutting edge. Furthermore, different wear patterns can be designed for different cutters across the drill bit.

BRIEF DESCRIPTION OF THE DRAWINGS

FIG. 3E is a cross section of a fifth embodiment of the PDC cutter of FIGS. 2A-2C.

FIG. 6A is a top view, and FIGS. 6B and 6C are cross sections, taken along section lines 6B-6B of FIG. 6A, of two embodiments of a representative example of a PDC cutter, such as that shown in FIGS. 2A-2C, into which a hydrophilic additive has been dispersed or added in discrete regions within its diamond structure, and then leached to form a seventh representative example of a selectively leached layer.

FIG. 7A is a top view, and FIGS. 7B and 7C are cross sections, taken along section lines 7B-7B of FIG. 7A, of two embodiments of a representative example of a PDC cutter, such as that shown in FIGS. 2A-2C, into which a hydrophilic additive has been dispersed or added in discrete regions within its diamond structure, and then leached to form a eighth representative example of a selectively leached layer.

FIG. 10A is a top view, and FIGS. 10B and 10C are cross sections, taken along section lines 10B-10B of FIG. 10A, of two embodiments of a representative example of a PDC cutter, such as that shown in FIGS. 2A-2C, into which a hydrophilic additive has been dispersed or added in discrete regions within its diamond structure, and then leached to form a eleventh representative example of a selectively leached layer.

DETAILED DESCRIPTION OF EXEMPLARY EMBODIMENTS

In the following description, like numbers refer to like elements.

Figures 1, 2A:
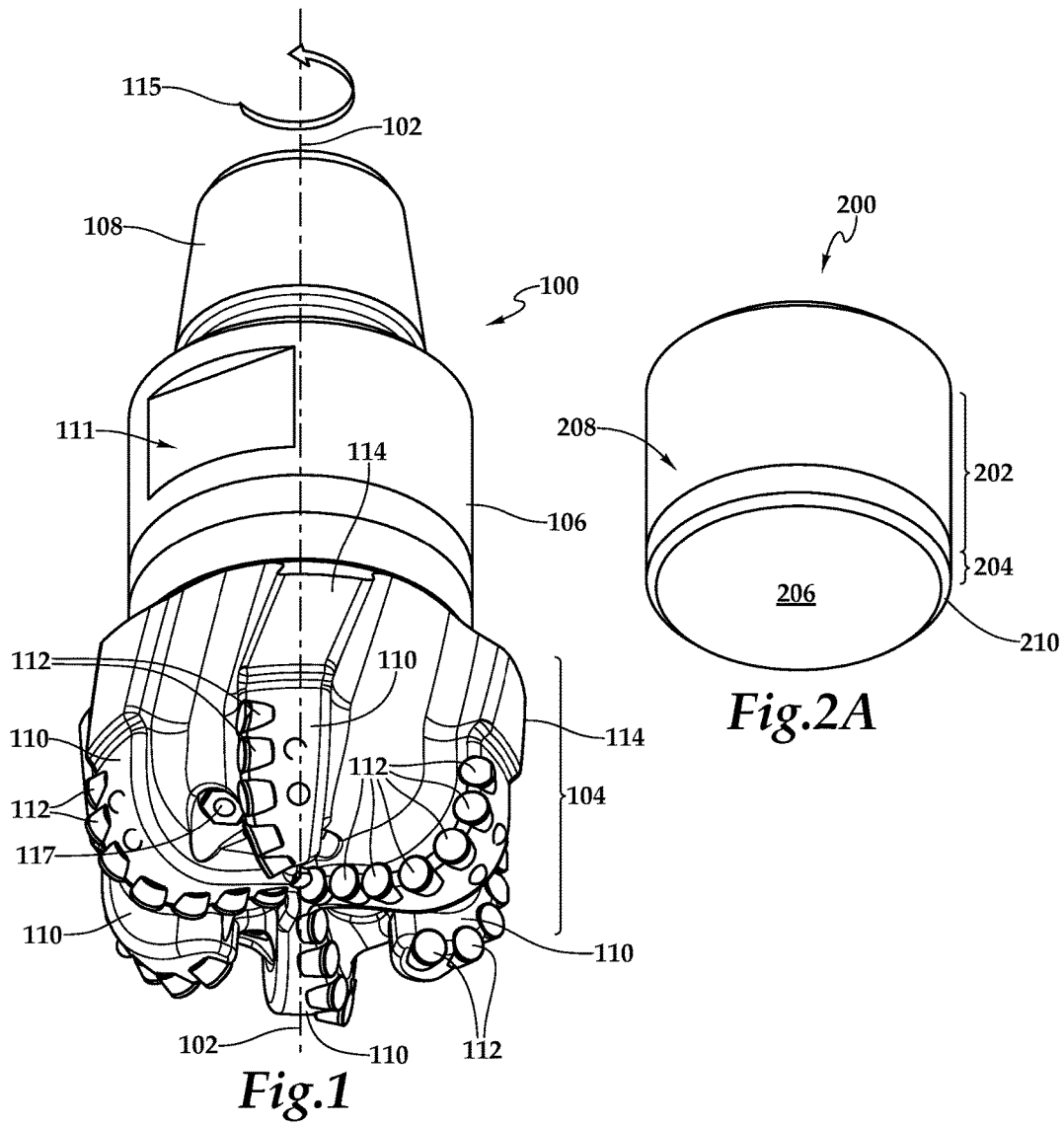
FIG. 1 is a perspective view of a PDC drag bit.
FIGS. 2A, 2B, and 2C are perspective, side, and top views, respectively, of a representative PDC cutter suitable for the drag bit of FIG. 1.

FIG. 1 illustrates an example of a PDC drag bit. PDC drag bit 100 is intended to be a representative example of drag bits and, in general, drill bits for drilling oil and gas wells. Intended to be rotated around its central axis 102, it is comprised of a bit body 104 connected to a shank 106 having a tapered threaded coupling 108 for connecting the bit to a drill string and a "bit breaker" surface 111 for cooperating with a wrench to tighten and loosen the coupling 108 to the drill string. The exterior surface of the body intended to face generally in the direction of boring is referred to as the face of the bit. The face generally lies in a plane perpendicular to the central axis 102 of the bit. The body is not limited to any particular material. It can be, for example, made of steel or a matrix material such as powdered tungsten carbide cemented by metal binder.

Disposed on the bit face are a plurality of raised "blades," each designated 110, that rise from the face of the bit. Each blade extends generally in a radial direction, outwardly to the periphery of the cutting face. In this example, there are six blades substantially equally spaced around the central axis and each blade, in this embodiment, sweeps or curves backwardly in relation to the direction of rotation indicated by arrow 115.

On each blade is mounted a plurality of discrete cutting elements, or "cutters," 112. Each discrete cutting element is disposed within a recess or pocket. In a drag bit the cutters are placed along the forward (in the direction of intended rotation) side of the blades, with their working surfaces facing generally in the forward direction for shearing the earth formation when the bit is rotated about its central axis. In this example, the cutters are arrayed along blades to form a structure cutting or gouging the formation and then pushing the resulting debris into the drilling fluid which exits the drill bit through the nozzles 117. The drilling fluid in turn transports the debris or cuttings uphole to the surface.

In this example of a drag bit, all of the cutters 112 are PDC cutters. However, in other embodiments, not all of the cutters need to be PDC cutters. The PDC cutters in this example have a working surface made primarily of super hard, polycrystalline diamond, or the like, supported by a substrate that forms a mounting stud for placement in a pocket formed in the blade. Each of the PDC cutters is fabricated discretely and then mounted—by brazing, press fitting, or otherwise—into pockets formed on bit. However, the PDC layer and substrate are typically used in the cylindrical form in which they are made. This example of a drill bit includes gauge pads 114. In some applications, the gauge pads of drill bits such as bit 100 can include an insert of thermally stable, sintered polycrystalline diamond (TSP).

Figures 2B, 2C:
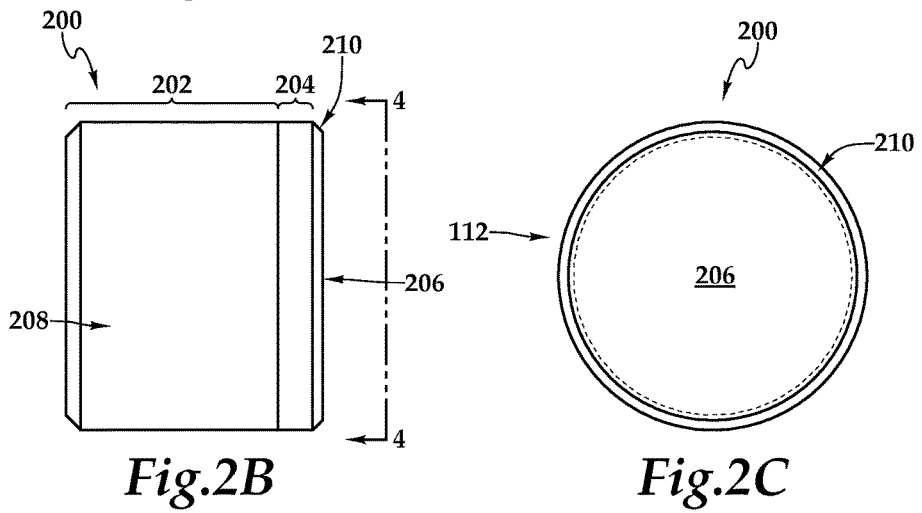

FIGS. 2A-2C illustrate a representative example of a PDC cutter. This representative cutter 200 is also used in FIGS. 3A to 10B, to describe different leaching patterns, and therefore please also reference these following description of FIGS. 2A to 2C for a description of like numbered elements in those figures. Representative cutter 200 is comprised of a substrate 202, to which is attached a layer of sintered polycrystalline diamond (PCD) 204. This layer is sometimes also called a diamond table. Note that the cutter is not drawn to scale and intended to be representative of cutters generally that have a polycrystalline diamond structure attached to a substrate, and in particular the one or more of the PDC cutters 112 on the drill bit 100 of FIG. 1. Although frequently cylindrical in shape, PDC cutters in general are not limited to a particular shape, size, or geometry, or to a single layer of PCD. In this example, an edge between top surface 206 and side surface 208 of the layer of PCD 204 is beveled to form a beveled edge 210. The top surface and the beveled surface are, in this example, each a working surface for contacting and cutting through the formation. A portion of the side surface, particularly nearer the top, may also come into contact with the formation or debris. Not all of the cutters on a bit must be of the same size, configuration, or shape. In addition to being sintered with different sizes and shapes, PDC cutters can be cut, ground, or milled to change their shapes. Furthermore, the cutter could have multiple discrete PCD structures. Other examples of possible cutter shapes might pre-flatted gauge cutters, pointed or scribe cutters, chisel-shaped cutters, and dome inserts.

Referring now also FIGS. 3A to 10C, the sintered polycrystalline diamond structure comprising the layer of PCD 204 has at least one region or area within the diamond structure in which a predetermined hydrophilic additive is interspersed within the diamond structure. Stippling indicates these regions. Each of the one or more regions has predetermined dimensions and position within the structure. The diamond structure outside the one or more regions contains relatively less of the additive substance or substances. In an alternate embodiment, the diamond structure outside the one or more regions containing the additive substance is substantially devoid of the one or more additive materials.

In one embodiment, at least one trace material is comprised of a hydrophile comprised of mineral with hydrophilic properties. The hydrophilic material will reduce surface tension between the diamond grains and acids and/or electrolytes in the leaching solution, thereby promoting capillary action and/or reducing capillary resistance within the pores or spaces between bonded diamond grains, resulting in improved flow of leaching solution through the diamond structure.

Hydrophilic additives include materials having a chemically polar molecular structure, electric dipole or multi-pole moment, a separation of electric charge within the molecule, or electrically conductive substances. Specific examples of hydrophilic additives suitable for the embodiments described herein include titanium diboride ($TiB_2$) wurtzite boron nitride (w-BN), cubic boron nitride (c-BN), zirconium diboride ($ZrB_2$), wurtzite silicon carbide, electrically conductive carbon allotropes, fullerenes, and similar compounds.

In another embodiment, the diamond structure is formed by mixing small or fine grains of synthetic or natural diamond, referred to within the industry as diamond grit or powder, with grains of the hydrophilic additive (with or without additional materials) according to a predetermined proportion to obtain a desired concentration. This mixing of the diamond grit and the hydrophilic can be done prior to formation of a compact, or during formation of the compact, depending on the manufacturing technique used. The compact is formed either entirely of the mixture or, alternatively, the compact is formed with the mixture discrete regions or volumes within the compact—containing the mixture and the remaining portion of the compact (or at least one other region of the compact) comprising PCD grains (with any additional material) but not the hydrophilic additive. The formed compact is then sintered under high pressure and high temperature (HPHT) in the presence of a catalyst, such as cobalt, a cobalt alloy, or any group VIII metal or alloy. The process of subjecting the compact to HPHT is sometimes referred to as a "pressing." The catalyst may be infiltrated into the compact by forming the compact on a substrate of tungsten carbide that is cemented with the catalyst, and then sintering. The catalyst may also be mixed with the diamond grit. The result is a sintered PCD structure with at least one region containing the hydrophilic additive dispersed throughout the region in the same proportion as the mixture.

The hydrophilic additive may have a grain size of between 0 and 60 microns in one embodiment, between 0 and 30 microns, and between 0 and 10 microns in another embodiment. The grains of PCD in the mixture may be within the range of 0 to 60 microns, and may be as small as nano particle size. The proportion or concentration of hydrophilic additive within the mixture, and thus within the region containing the hydrophilic additive, is in one embodiment 10% or less by volume, in another less than 5% by volume, and in another less than 1% by volume. In other exemplary embodiments it is in the range 0.05% to 2% by volume and in a further embodiment, in the range of 0.05% to 0.5% by volume. The PCD may, in alternate embodiments, be layered within the compact according to grain size. For example, a layer next to a working layer will be comprised of finer grains (i.e. grains smaller than a predetermined grain size) and a layer further away, perhaps a base layer next to the substrate, with grain larger than the predetermined size. The hydrophilic additive can be mixed with the finer grain diamond grit mix to form a first region or layer next to a working surface. Alternately, it can be mixed with multiple layers of diamond grit mix, with each layer having a different grain size (as measured by the largest grain) or different range of grain sizes.

Alternately, mixtures having different concentrations or proportions of hydrophilic additive material within the PCD structure may form a plurality of different regions or layers in the diamond structure, with or without having the hydrophilic additive in the remaining structure of the PCD layer.

In another embodiment, a hydrophile additive (or more than one) can be introduced into a formed, but unsintered compact. In another embodiment, the additive can be introduced into a PCD structure after one or more pressings take place, including between pressings. In these embodiments, the introduction of the additive occurs before leaching. Examples of processes that can be used to introduce the additive(s) include backfilling and ion deposition. In other embodiments, one or more hydrophile additives could also be introduced at two or more of the fabrication stages: formation of the compact, after formation of the compact but before pressing; or after at least one pressing. The same hydrophilic additive need not be introduced at the two or more different stages, more than one hydrophilic additive can be introduced in the same stage, and different hydrophilic additives could be introduced in different, predetermined regions of the diamond structure.

The regions containing hydrophilic additives are also referred to as "seeded regions" regardless of how the hydrophilic additive is introduced or incorporated into the region. Hydrophilic additive may, therefore, also sometimes referred to seed material or hydrophilic seed material.

It is believed that PCD, into which is dispersed a hydrophilic additive will result in a sintered polycrystalline diamond structure with faster leaching times. Furthermore, it is believed a PDC cutter with a layer of PCD that is formed according to the method described above with a hydrophilic seed material, and in particular with BNw as a seed material, performs better than the same PDC cutter with diamond structure formed without any hydrophilic seed material due to increased fracture toughness and abrasion resistance.

In the different embodiments of PDC cutter 200 shown in FIGS. 3A to 10C, the regions or portion of the sintered PCD layer 204 in which a hydrophilic additive material (the "seeded regions" or "additive regions") is interspersed is generally indicated by stippling, and the depth to which a diamond structure is partially leached after a predetermined leaching time is indicated by a dashed line 300, the dashed line indicating the boundary between leached and non-leached areas within the PCD. Leached areas are those that have substantially less of the metal catalyst that remains after sintering than adjacent areas of the PCD structure. Preferably the leached areas have at least 50% or more of the metal catalyst removed. In alternate embodiments, the leached areas are substantially devoid of metal catalyst as compared to the remaining areas within the PCD. The drawings are not to scale.

Figure 3A:
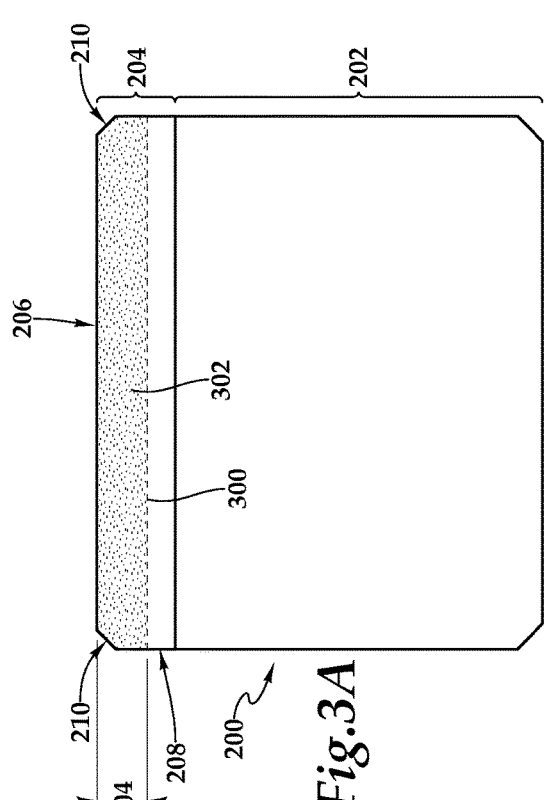
FIGS. 3A, 3B and 3C are cross-sections through different examples of a PDC cutter such as that shown in FIGS. 2A-2C, into which a hydrophilic additive has been dispersed or added in discrete regions within its diamond structure and then leached to partially or completely remove catalyst from at least these regions to form an example of a selectively leached layer.
Figure 3B:
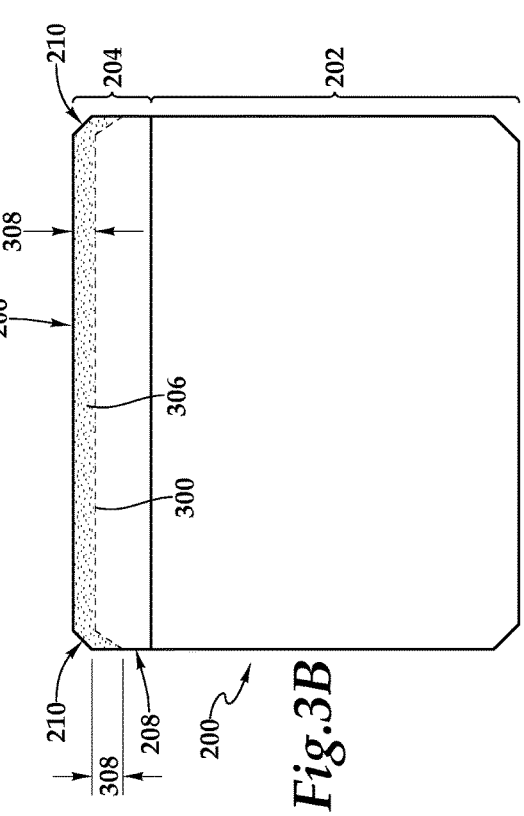
Figure 3C:
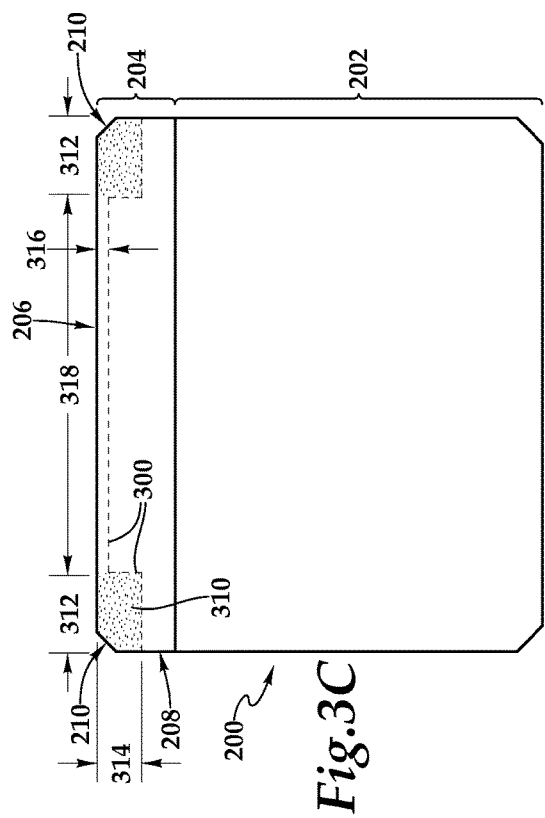

In each of the examples of FIGS. 3A to 3C the additive region is adjacent the top surface 206 and the beveled peripheral edge surface 210, each of which is a working surface.

In the embodiment of FIG. 3A, the region of seeding 302 extends across the entire top surface of layer of PCD 204, and down a portion of its sides. It extends downwardly from the top surface 206 to a uniform depth 304 as measured from the top surface and is less than the thickness of the PCD layer. As indicated by the dashed line 300 the layer of PCD is leached to the depth 304, the leaching removing a substantial percentage of the metal catalyst remaining in the layer of PCD after sintering as compared to unleached regions.

The additive region 306 of the embodiment of FIG. 3B also extends, like the embodiment of FIG. 3A, across the full face of the layer of PCD 204. The region extends a distance 308 down a side surface 208 of the sintered PCD layer 204 a distance that is approximately the same distance as the additive region 302 is from the top surface of the embodiment of FIG. 3A, as shown by depth 304. However, unlike the embodiment of FIG. 3A, the additive region extends a depth from the top surface that is approximately the distance 308, which is substantially less than the depth 304 of FIG. 3A. Because the rate of leaching is relatively faster in the additive region 306 than the regions without additive in the layer of PCD, the leaching pattern, indicated by line 300, can be made substantially coincident with the additive region's boundary.

The embodiment of FIG. 3C has an annular shaped additive region 310 that extends inwardly from the periphery of top surface 206, shown as 208 of FIG. 3C, by a distance 312 (which is less than the radius of the top surface) and to a depth 314 as measured from the top surface 206. This embodiment is leached to a depth indicated by a dashed line 300. Because the leaching rate is faster for the additive region 310, leach depth 314 in the additive region 310 is greater than the leach depth 316 in region 318 containing no additive (or substantially less additive) under the portion of top surface 206.

Figure 3D:
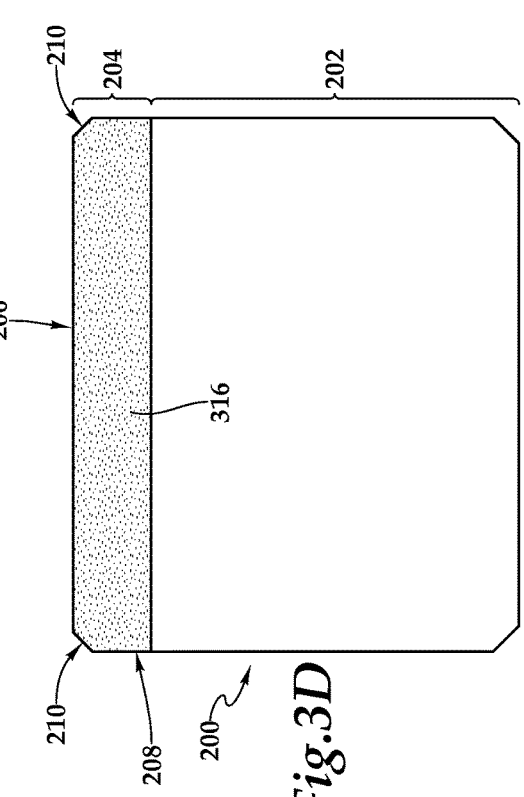
FIG. 3D is a cross section of a fourth embodiment of the PDC cutter of FIGS. 2A-2C with hydrophile interspersed throughout the layer PDC.

In the embodiment of FIG. 3D the entire layer of PCD 204 is seeded with hydrophilic additive. For diamond mixes of 0-10 microns, particularly if the pressing pressures are very higher, the resultant PCD tends to be very dense. This increased density leads to considerable increases in leaching times. It is believed that this is due to the PCD microstructure having relatively little interstitial space, thus inhibiting the access of the leaching acid to the group VIII metal catalyst. For instance, if the PCD layer is comprised of diamond grit with grain sizes of 0-10 microns, pressed at elevated pressure, the practical limitation in leach depth will be of the order of 250 microns. This is due to the degradation of the sealing materials used to prevent the acid from contacting the substrate. If nano particles are used in the diamond grit, this practical leaching depth will reduce further as the diamond density increases further, such that the benefits of leaching become negligible. The addition of the hydrophilic additive seeding material makes it practical to leach fine grained diamond feed PCD, with grain sizes less than 20 microns, to depths well in excess of 500 microns, and in some embodiments in excess of 1200 microns.

The embodiment of FIG. 3E is similar to the embodiment FIG. 3C, but instead it has an additive region or seeded region 320 that extends across the full face of the layer of PCD 204. One portion of region 320, which has a diameter 322, is seeded to a depth 326. Like the embodiment of FIG. 3C, the region also has an annular portion that extends inwardly from the periphery 208 of the diamond structure or PCD layer 204, by a distance 324 (which is less than the radius of the top surface). However, the depth of this annular portion extends from the top surface down to near the substrate 202. This embodiment is leached to a depth indicated by a dashed line 300. As the working surfaces 206 are worn, a non-leached region 328 is exposed. The leached region, which is above, as well as to the side of, the boundary between the leached and non-leached regions represented by dashed line 300, acts as a cap that surrounds the top and sides the non-leached region 328 that is below the boundary. The boundary between leached and non-leached regions is not parallel to the top surface 206.

FIGS. 4A to 10B illustrate various representative example of geometries of leached layers that can be achieved by selectively seeding or placing in one or more regions of a sintered PCD layer 204 of cutter 200 an additive hydrophilic prior to leaching, and then leaching for a predetermined time to achieve a leached area or region between top surface 206 and the boundary 300 between leached and non-leached regions of the PCD.

Figure 4A:
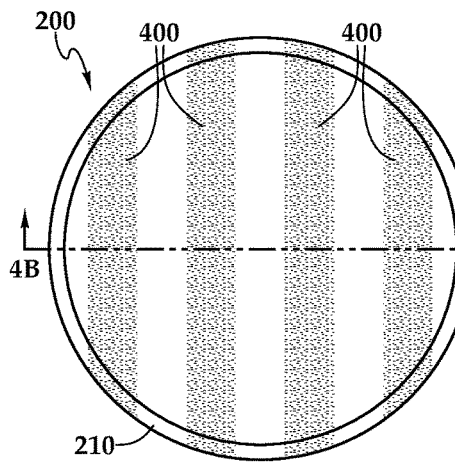
FIG. 4A is a top view.
Figure 4B:
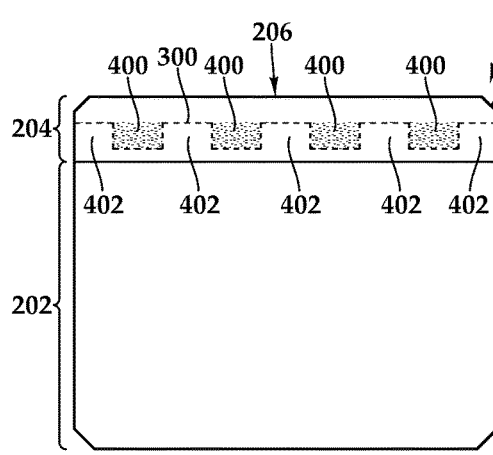
FIGS. 4B and 4C are cross sections, taken along section lines 4B-4B of FIG. 4A, of two embodiments of a fifth representative example of a PDC cutter, such as that shown in FIGS. 2A-2C, into which a hydrophilic additive has been dispersed or added in discrete regions within its diamond structure, and then leached to form a second example of a selectively leached layer.
Figure 4C:
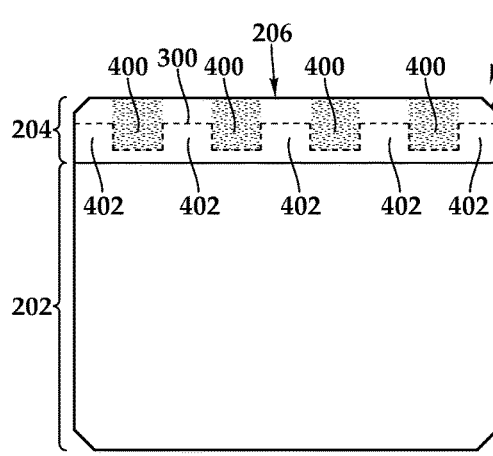

In the example of FIGS. 4A, 4B, and 4C a plurality of regions in the PCD layer 204 of cutter 200 arranged as a plurality of parallel ribs 400 extending across the cutter. Within each of the regions is placed a hydrophilic additive. When top surface 206 is subjected to leaching solution for a predetermined time, the PCD layer is leached to a boundary indicated by dashed line 300. As the cutter wears to the top of ribs 400, past the boundary between the leached and non-leached regions, the non-leached regions 402 between the ribs are exposed and start to wear faster, thus creating a non-planar worn surface and a changed cutting profile. This non-planar or serrated wear profile tends to increase the aggressiveness of the PDC cutter, which in turn improves the efficiency of the drill bit in which the cutters are used.

Figure 5A:
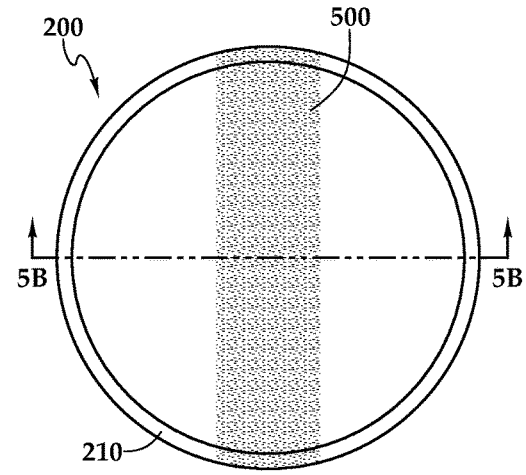
FIG. 5A is a top view.
Figure 5B:
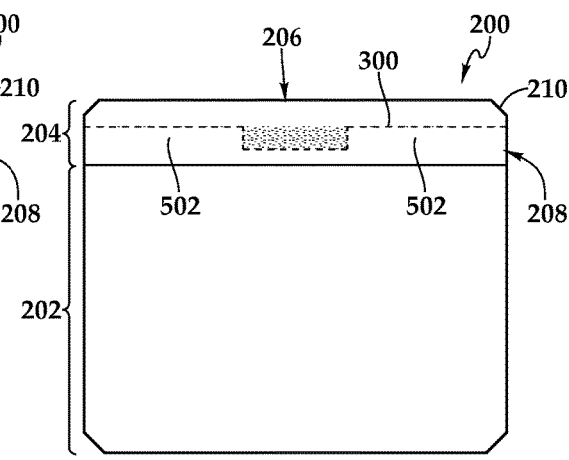
FIGS. 5B and 5C are cross sections, taken along section lines 5B-5B of FIG. 5A, of two embodiments of a representative example of a PDC cutter, such as that shown in FIGS. 2A-2C, into which a hydrophilic additive has been dispersed or added in a discrete region within its diamond structure, and then leached to form a sixth example of a selectively leached layer.
Figure 5C:
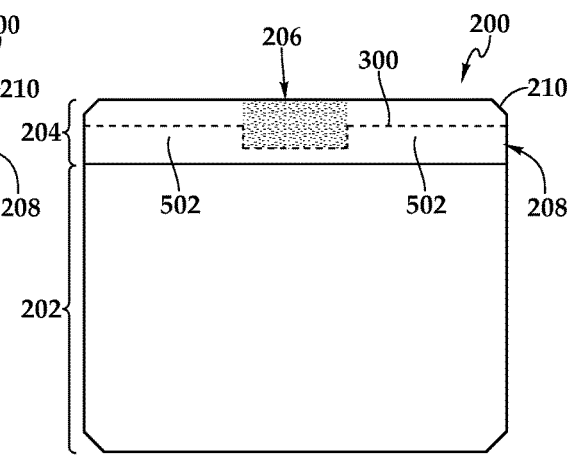

FIGS. 5A, 5B and 5C illustrate another example of a PDC cutter with a single region 500 of the PCD layer 204 containing a hydrophilic additive. The region extends from one side of the cutter to the other, through the center of the cutter. The leached area boundary indicated by dashed line 300. The top surface 206 is subjected to a leaching bath for a predetermined period of time to leach layer of PCD from the top surface 206 to the boundary. When the working surface is worn to the boundary during use, areas 502 wear faster than the rib formed by region 500.

The example of FIGS. 6A, 6B and 6C illustrate another selective leaching arrangement for PDC cutter 200, in which a doughnut-shaped region 600 contains a hydrophilic additive that speeds leaching within that region. The PDC cutter is leached for a predetermined time, with the result that it is leached from its top surface 206 to the boundary between leached and non-leached regions indicated by dashed line 300. As working surface is worn down to the boundary, non-leached region 602 begins to wear more quickly than region 600, creating a non-planar wear surface having comprising an annulus or ring of thermally stable PCD around the periphery of the cutter's top surface 206.

FIGS. 7A, 7B and 7C illustrate yet another example of a non-planar boundary between thermally stable leached areas and non-leached areas in the example of a PDC cutter 200. In this example a hydrophilic additive is added rib-shaped regions 700 and annular region 702 to increase leach rates, with the result that the PDC layer 204 is leached from top surface 206 to depths indicated by dashed line 300. The non-planar boundary between the thermally stable leached regions and the non-leached regions 702 is shown in FIGS. 7B and 7C. As the working surface is worn, the non-leached areas 702 are exposed. Those regions begin to wear faster, thus creating a non-planar worn working surface with an outer ring or annulus and a plurality of ribs extending across the annulus. In an alternative embodiment a single rib can be used in place of a plurality of ribs.

Figure 8A:
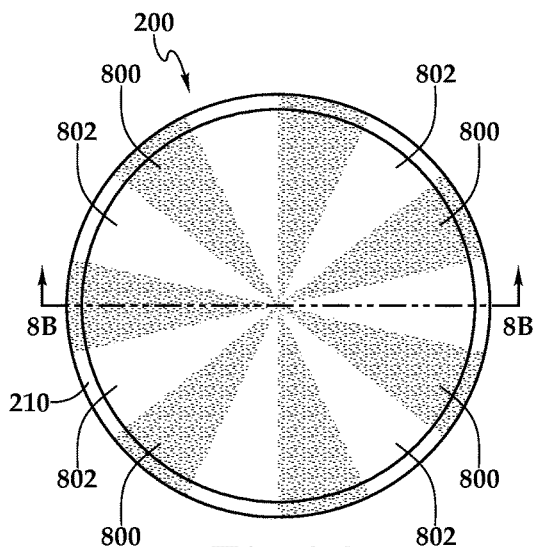
FIG. 8A is a top view.
Figure 8B:
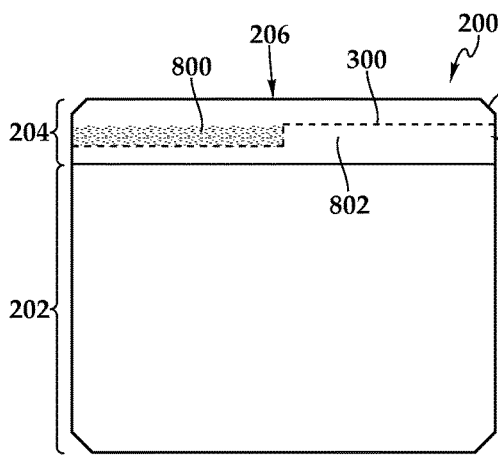
FIGS. 8B and 8C are cross sections, taken along section lines 8B-8B of FIG. 8A, of two embodiments of a representative example of a PDC cutter, such as that shown in FIGS. 2A-2C, into which a hydrophilic additive has been dispersed or added in discrete regions within its diamond structure, and then leached to form a ninth representative example of a selectively leached layer.
Figure 8C:
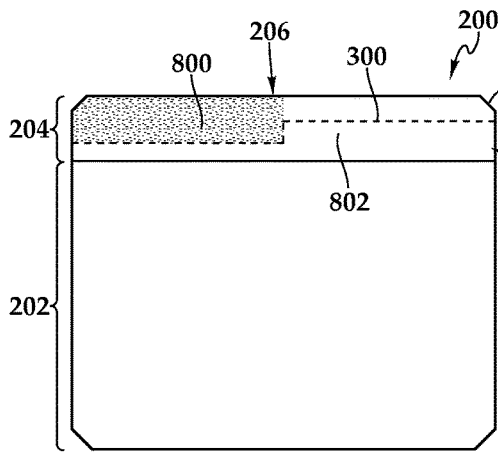

Referring now to FIGS. 8A, 8B, and 8C regions 800 within PCD layer 204 of the example of a PDC cutter 200 contain a hydrophilic additive. The cutter is then leached from the top surface 206 for a predetermined period of time, resulting in a leached area extending between the top surface 206 and a boundary indicated generally by dashed line 300. Regions 800 are arranged radially around the cutter, extending from near the cutter's centerline to its outer periphery.

Furthermore, in this example, they are triangular or wedge-shaped. As the working surface wears, non-leached regions 802 are exposed and tend to wear faster, exposing the regions 800 and creating a non-planar wear surface with a different cutting profile.

Figure 9A:
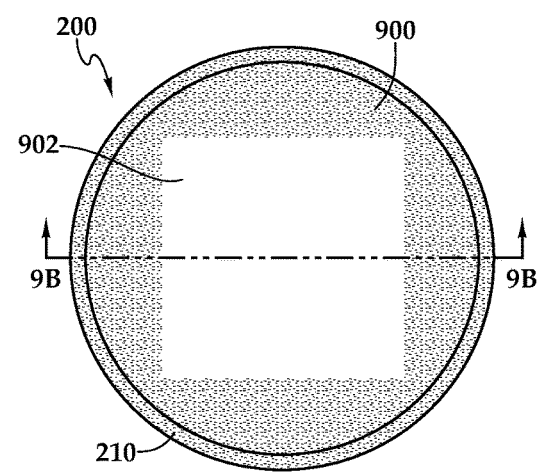
FIG. 9A is a top view.
Figure 9B:
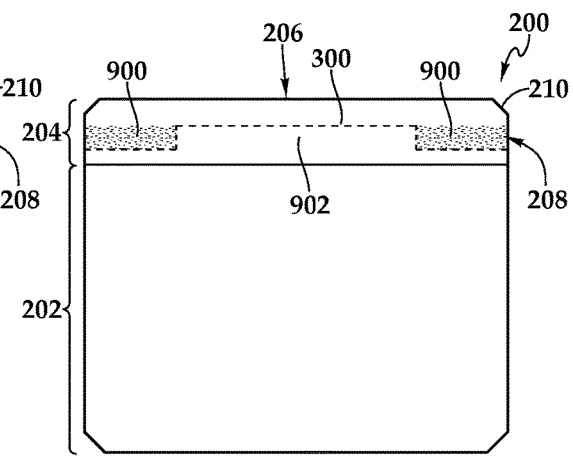
FIGS. 9B and 9C are cross sections taken along section lines 9B-9B of FIG. 9A, of two embodiments of a representative example of a PDC cutter, such as that shown in FIGS. 2A-2C, into which a hydrophilic additive has been dispersed or added in discrete regions within its diamond structure, and then leached to form a tenth representative example of a selectively leached layer.
Figure 9C:
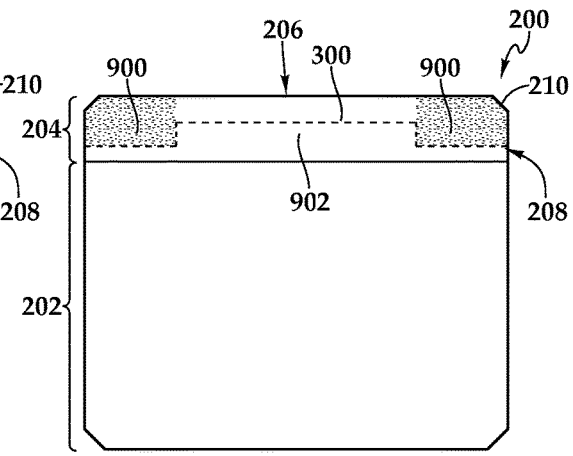

In the example of FIGS. 9A, 9B, and 9C a hydrophilic additive is placed within region 900 of layer 204 of PDC cutter 200, and the cutter is leached to create a leached region extending between top surface 206 to depths indicated by dashed line 300. As the working surface of this cutter example wears, a square-shaped non-leached region 902 in its center is exposed and will wear more quickly than the region 900 around the periphery of top surface 206 of the cutter, thus creating a non-planar working surface.

FIGS. 10A, 10B and 10C illustrate an example of a complex pattern of regions in which a hydrophilic additive has been placed. Regions 1000 are rib-like, and regions 1002 are small rings placed between the rib-like regions 1000. The boundary between leached and non-leached areas is indicated by dashed line 300. As the working surface is worn during use, non-leached areas are exposed and worn away more quickly, which in turn exposes different geometries of thermally stable diamond structures depending on how the cutter is being worn.

In the preceding examples the patterns or geometries of the regions containing a hydrophilic additive are representative of configurations that are possible. The boundaries of the regions and areas indicated in the drawings are schematic in nature and intended to be representative. In practice the boundaries between the leached and non-leached regions, and between regions containing a hydrophilic additive and those that do not contain (or contain substantially less hydrophilic additive) may not be so sharply or precisely delineated.

The regions containing hydrophilic material shown in each of the foregoing examples may extend from the top surface 206 of the cutter, as indicated in FIGS. 4C, 5C, 6C, 7C, 8C, 9 and 10C, or start below the top surface, as indicated by FIGS. 4B, 5B, 6B, 7B, 8B, 9B and 10B.

Furthermore, the foregoing examples contemplate the same additive being added to the seeded regions. However, different additives could be used for different regions to have, for example, seeded regions with different leaching rates. Different concentrations of the same additive or different additives could be used in different seeded regions. Furthermore, changing the grain size, or the range of grain sizes, of the diamond grit used to form different portions of the diamond structure the will not only change the wear properties of the diamond structure, but also the rate at which it can be leached. Thus, selecting and varying one or more of the size or range of diamond grit in addition to controlling one or more of the choice of additive or additives, the additive grain size and additive concentration within the diamond structure, different geometries of thermally stable regions within the PCD can be engineered to achieve desired properties.

The foregoing description is of exemplary and preferred embodiments. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated or described structures or embodiments.

What is claimed is:

1. A method of fabricating a sintered polycrystalline diamond structure, comprising:
    forming a compact comprising diamond grit;
    sintering the compact in the presence of a catalyst to thereby form a diamond structure comprising an integral mass of sintered polycrystalline diamond (PCD) exhibiting diamond-to-diamond bonding, the metal catalyst occupying voids therein; and
    partially leaching the sintered diamond structure by removing the catalyst from an area within the sintered diamond structure adjacent to a working surface of the structure;
    wherein the sintered diamond structure comprises at least one region interspersed with at least one additive for increasing the permeability of the PCD or acceptance of the PCD to a leaching solution within portions of the compact as compared to at least one other region of the diamond structure containing less of said at least one additive; and
    wherein said at least one additive is selected from a group consisting of, but not limited to, titanium diboride ($TiB_2$), wurtzite boron nitride (w-BN), cubic boron nitride (c-BN), zirconium diboride ($ZrB_2$), wurtzite silicon carbide, and electrically conductive carbon allotropes, wherein said at least one additive is not a fullerene.

2. The method of claim 1, wherein the catalyst is comprised of metal.

3. The method of claim 1, wherein the sizes of the grains of said additive are less than 60 microns.

4. The method of claim 1, wherein the sizes of the grains of diamond grit are less than 60 microns.

5. The method of claim 4, wherein the sizes of the grains of diamond grit are less than 30 microns.

6. The method of claim 4, wherein the sizes of the grains of diamond grit are less than 100 nanometers in at least one dimension.

7. The method of claim 1, wherein said at least one additive comprises less than 10% by volume of the at least one region of the diamond structure.

8. The method of claim 7, wherein said at least one additive comprises less than 5% by volume of the at least one region of the diamond structure.

9. The method of claim 7, wherein said at least one additive comprises less than 1% by volume of the at least one region of the diamond structure.

10. The method of claim 7, wherein the amount of said at least one additive in the at least one region of the diamond structure comprises an amount of between 0.05% and 0.5% by volume of the at least one region of the diamond structure.

11. The method of claim 1, wherein the compact has a plurality of surfaces, at least one of which is a working surface; and wherein the compact has at least one discrete region that is adjacent the working surface that contains the at least one additive, and at least one region not containing the at least one additive.

12. The method of claim 1, wherein the compact is formed with a plurality of surfaces, at least one of which is a working surface and at least one of which is a bottom surface; and wherein the compact is formed with at least two layers of PCD, a first layer of PCD having grains of a first size or size range adjacent the working surface, and a second layer nearer the bottom surface having grains of PCD larger than the first size or size range.

13. The method of claim 1, further comprising leaching metal catalyst from the diamond structure.

14. The method of claim 1, wherein,
the compact has a plurality of surfaces, at least one of which is a working surface;
the compact has at least one discrete region that is adjacent the working surface that contains the at least one additive, and at least one region not containing the at least one additive; and
the method further comprises leaching catalyst from the diamond structure, including from the at least one discrete region containing the mixture.

15. The method of claim 1, wherein said at least one additive is dispersed into the at least one region of the diamond structure by mixing said at least one additive into the diamond grit and forming the compact with the mixture comprising the diamond grit and said at least one additive in the at least one region.

16. The method of claim 1, wherein said at least one additive is dispersed into the at least one region of the compact, after the compact is formed and before the compact is sintered.

17. A method of fabricating a sintered polycrystalline diamond structure, comprising:
forming a compact comprising diamond grit;
sintering the compact in the presence of a catalyst to thereby form a diamond structure comprising an integral mass of sintered polycrystalline diamond (PCD) exhibiting diamond-to-diamond bonding, the metal catalyst occupying voids therein; and
partially leaching the sintered diamond structure by removing the catalyst from an area within the sintered diamond structure adjacent to a working surface of the structure;
wherein the sintered diamond structure comprises at least one region interspersed with at least one additive for increasing the permeability of the PCD or acceptance of the PCD to a leaching solution within portions of the compact as compared to at least one other region of the diamond structure containing less of said at least one additive; and
wherein the at least one additive is located in at least one, discrete region within the compact, and wherein the compact has at least one other region with PCD devoid of additive.

18. A method of fabricating a sintered polycrystalline diamond structure, comprising:
forming a compact comprising diamond grit;
sintering the compact in the presence of a catalyst to thereby form a diamond structure comprising an integral mass of sintered polycrystalline diamond (PCD) exhibiting diamond-to-diamond bonding, the metal catalyst occupying voids therein; and
partially leaching the sintered diamond structure by removing the catalyst from an area within the sintered diamond structure adjacent to a working surface of the structure;
wherein the sintered diamond structure comprises at least one region interspersed with at least one additive for increasing the permeability of the PCD or acceptance of the PCD to a leaching solution within portions of the compact as compared to at least one other region of the diamond structure containing less of said at least one additive; and
wherein the at least one additive has a first proportion of additive to PCD, and wherein the method further comprises mixing grains of diamond grit mix with grains of said at least one additive in a second proportion different from the first proportion, and wherein forming the compact comprises at least one discrete region of the mixture with the first proportion of the additive and PCD and at least one discrete region of the mixture of said at least one additive and PCD in the second proportion.

19. A method of fabricating a sintered polycrystalline diamond structure, comprising:
forming a compact comprising diamond grit;
sintering the compact in the presence of a catalyst to thereby form a diamond structure comprising an integral mass of sintered polycrystalline diamond (PCD) exhibiting diamond-to-diamond bonding, the metal catalyst occupying voids therein; and
partially leaching the sintered diamond structure by removing the catalyst from an area within the sintered diamond structure adjacent to a working surface of the structure;
wherein the sintered diamond structure comprises at least one region interspersed with at least one additive for increasing the permeability of the PCD or acceptance of the PCD to a leaching solution within portions of the compact as compared to at least one other region of the diamond structure containing less of said at least one additive; and
wherein,
the compact has a plurality of surfaces, at least one of which is a working surface;
the compact has at least one discrete region that contains the at least one additive and a region not containing the at least one additive; and
the method further comprises leaching from the diamond structure metal catalyst from the working surface, the leaching occurring within at least a portion of both the at least one discrete region containing the at least one additive and the region not containing the at least one additive.

20. A method of fabricating a sintered polycrystalline diamond structure, comprising:
forming a compact comprising diamond grit;
sintering the compact in the presence of a catalyst to thereby form a diamond structure comprising an integral mass of sintered polycrystalline diamond (PCD) exhibiting diamond-to-diamond bonding, the metal catalyst occupying voids therein; and
partially leaching the catalyst from an area within the sintered diamond structure adjacent to a working surface of the structure;
wherein the sintered diamond structure comprises at least one region interspersed with at least one additive for increasing the permeability of the PCD or acceptance of the PCD to a leaching solution within portions of the compact as compared to at least one other region of the diamond structure containing less of said at least one additive; and
wherein said at least one additive is dispersed into the diamond structure by backfilling or ion deposition after sintering the compact and prior to partially leaching the diamond structure.

21. A method of fabricating a sintered polycrystalline diamond structure, comprising:
forming a compact comprising diamond grit with at least one region interspersed with at least one additive;
sintering the compact by infiltrating a metal catalyst to form the diamond structure comprising an integral mass of sintered polycrystalline diamond (PCD) exhibiting diamond-to-diamond bonding, the metal catalyst occupying voids therein; and partially leaching the sintered diamond structure to remove the metal catalyst from an area within the sintered diamond structure adjacent to a working surface of the structure;

wherein the additive increases the permeability to a leaching solution within portions of the sintered diamond structure as compared to at least one other region of the sintered diamond structure containing less of said at least one additive and wherein the at least one additive is not a fullerene.

22. The method of claim 21, wherein said additive is comprised of one or more hydrophiles.

23. The method of claim 21, wherein said at least one additive is selected from the group consisting of, but not limited to titanium diboride (TiB$_2$) wurtzite boron nitride (w-BN), cubic boron nitride (c-BN), zirconium diboride (ZrB$_2$), wurtzite silicon carbide, and electrically conductive carbon allotropes.

24. A method of fabricating a sintered polycrystalline diamond structure, comprising:

forming a compact comprising diamond grit;

sintering the compact in the presence of a catalyst to thereby form a diamond structure comprising an integral mass of sintered polycrystalline diamond (PCD) exhibiting diamond-to-diamond bonding, the metal catalyst occupying voids therein; and partially leaching the sintered diamond structure by removing the catalyst from an area within the sintered diamond structure adjacent to a working surface of the structure;

wherein after leaching the leached portion of the diamond structure has less of the metal catalyst that remains after sintering than adjacent areas of the PCD because the leached portion of the diamond structure contains at least one additive for increasing permeability of the PCD or acceptance of the PCD to a leaching solution; and wherein said at least one additive is selected from a group consisting of, but not limited to, titanium diboride (TiB$_2$), wurtzite boron nitride (w-BN), cubic boron nitride (c-BN), zirconium diboride (ZrB$_2$), wurtzite silicon carbide, and electrically conductive carbon allotropes, wherein said at least one additive is not a fullerene.

25. The method of claim 24, wherein after leaching, the leached portion of the diamond structure has at least 50% of the catalyst that remains after sintering removed by leaching.

26. The method of claim 25, wherein after leaching, the leached portion of the diamond structure is substantially devoid of metal catalyst.

* * * * *